Figure 1:
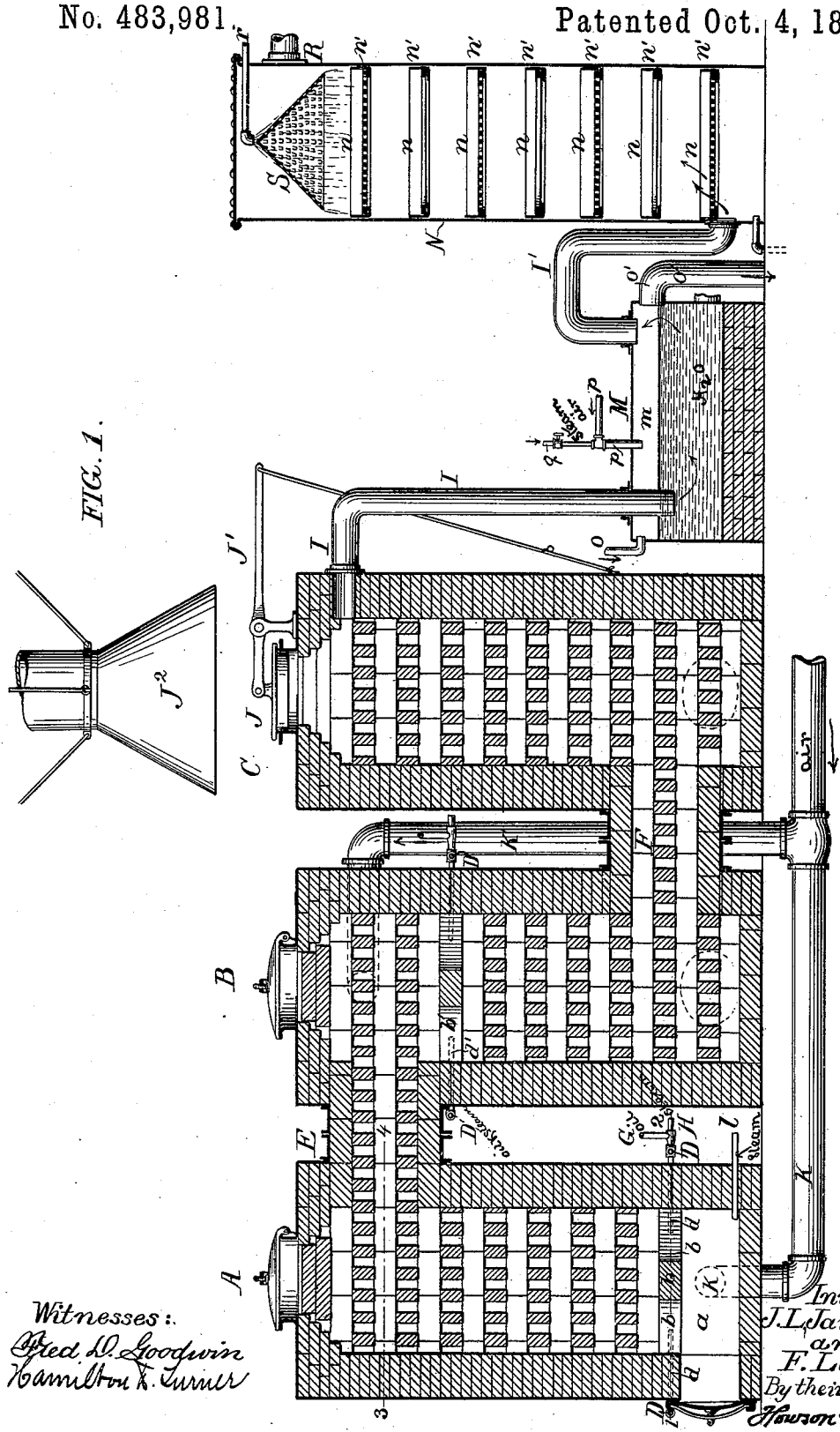

(No Model.) 2 Sheets—Sheet 2.

J. L. JANEWAY & F. LOGAN.
PROCESS OF AND APPARATUS FOR THE MANUFACTURE OF GAS.

No. 483,981. Patented Oct. 4, 1892.

Witnesses:
Fred D. Goodwin
Hamilton D. Turner

Inventors:
John L Janeway and
Ferdinand Logan
By their Attorneys
Howson & Howson

UNITED STATES PATENT OFFICE.

JOHN L. JANEWAY, OF PHŒNIXVILLE, AND FERDINAND LOGAN, OF CORNER STORES, PENNSYLVANIA.

PROCESS OF AND APPARATUS FOR THE MANUFACTURE OF GAS.

SPECIFICATION forming part of Letters Patent No. 483,981, dated October 4, 1892.

Application filed October 9, 1891. Serial No. 408,218. (No model.)

*To all whom it may concern:*

Be it known that we, JOHN L. JANEWAY, of Phœnixville, and FERDINAND LOGAN, of Corner Stores, in the county of Chester and State of Pennsylvania, citizens of the United States, have invented certain Improvements in the Process of and Apparatus for the Manufacture of Gas, of which the following is a specification.

Our invention consists of certain improvements in the method of and apparatus for manufacturing hydrocarbon gas from volatilizable liquid hydrocarbons—such as petroleum, naphtha, benzine, &c.—in which a chamber containing refractory material is heated and the liquid hydrocarbon is converted into gas by being brought into contact with the heated refractory material.

In the manufacture of gas by processes employing hydrocarbon oils, as heretofore practiced, it has been usual to heat the refractory material contained in the chambers or generators to an incandescent state and then inject the oil, the volatile parts of which immediately become carbonized, forming lampblack, which remains in the form of incandescent carbon so long as the required temperature is maintained. With this incandescent carbon is mingled a quantity of decomposed steam, the oxygen of which combines with the incandescent carbon and forms a carbonic-oxide or pure water gas. The heavier or less volatile parts of the oil enrich the gas and form an illuminating-gas. This heating of the refractory material to incandescence has been found extremely wasteful, owing to the enormous quantities of lampblack produced in excess of that which will combine with the decomposed steam and the burning out of the refractory material when it is exposed for any length of time to an incandescent heat.

In carrying our invention into effect we propose to avoid the making of lamp-black or incandescent carbon by heating the refractory material to a point below incandescence, the temperature varying with the quality of oil used, the more volatile products of petroleum—such, for instance, as gasoline, benzine, naphtha, &c.—requiring a less degree of heat than more heavy-bodied oils—such, for instance, as crude oil. The oil is fed in by a jet of steam, which mingles with and to some extent "deadens" and prevents the immediate carbonization of the oil and the production of lamp-black.

In practice we provide a series of chambers, preferably three in number, which are filled with refractory material and are connected to each other, so as to provide a continuous passage through all of the chambers, the connecting-passages between the various chambers being also preferably filled with refractory material, in order to utilize all of the available space possible. Into the first of these chambers is injected a supply of oil by means of a steam-jet, and a forced draft of air is employed to supply the oxygen necessary for the combustion of the oil to heat the refractory material within the chambers to the necessary temperature; or, if desired, the chambers may be heated by the employment of any other combustible material—such, for instance, as oil, "producer," or water gas. After the chambers have been heated, preferably to a substantially-uniform temperature, a supply of steam is injected into the bottom of the first chamber of the series and, passing up through said chamber in contact with the highly-heated refractory material, is superheated to some extent, care being taken that the temperature of the chamber is insufficient to effect the decomposition of the steam in the ordinary course of manufacture, although in starting into operation it is quite likely that a greater or less quantity of the steam will be decomposed and will combine with carbon introduced into the second chamber and form a greater or less quantity of carbonic-oxide or so-called "water" gas. At the top of the first chamber or at the top of the second chamber of the series is injected a supply of oil and steam, (the steam acting to prevent the conversion of the oil into lampblack.) The oil is vaporized and the superheated steam injected into the first chamber acts to force these hydrocarbon vapors through the remaining portion of the refractory material, the vapors being highly heated and forming a fixed hydrocarbon gas of high candle-power, which passes with its forcing medium (the steam) into a wash-box, where the steam is condensed and the hydrocarbon gas passes out to the scrubber, and from thence to the holder. While in the wash-box a supply of diluent is injected to reduce the candle-power of the gas to form a merchantable article, and for this purpose we introduce a supply of air, preferably by means of a steam-jet, which heats the air being introduced to or nearly to the temperature of the gas in the wash-box, thus enabling it to more readily combine with such gas and prevent stratification of the gas and air in the holder.

Figure 2:
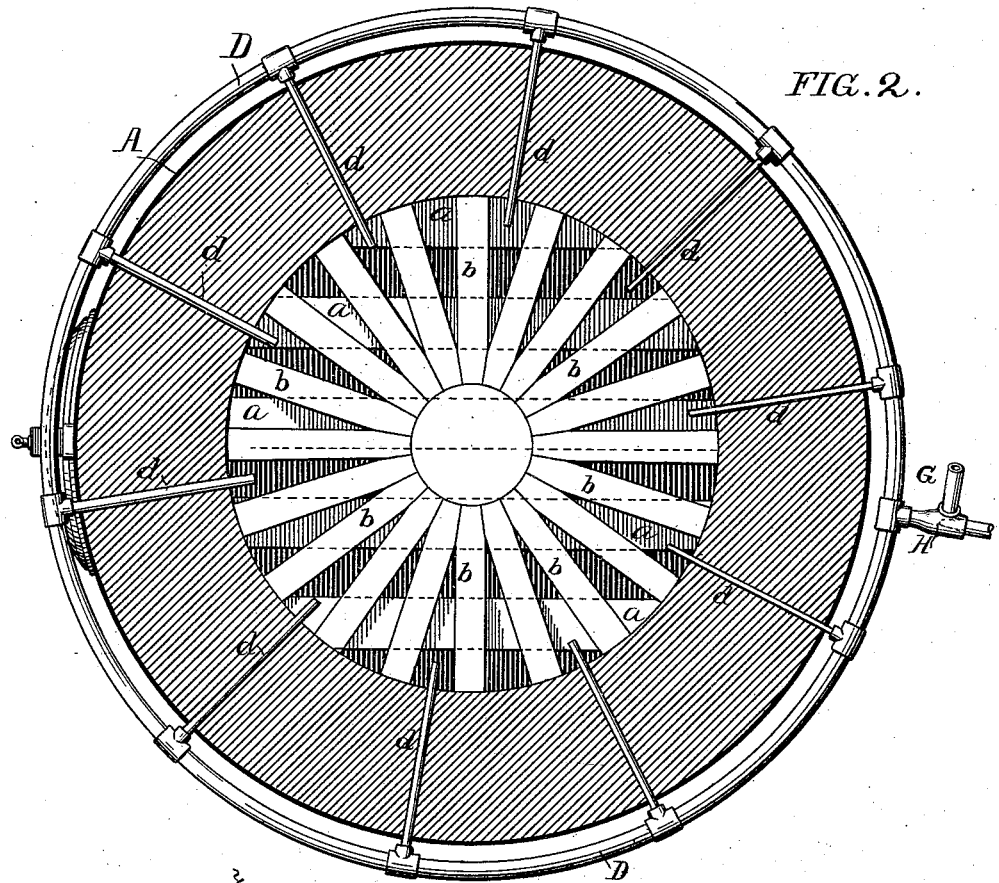
Figure 3:
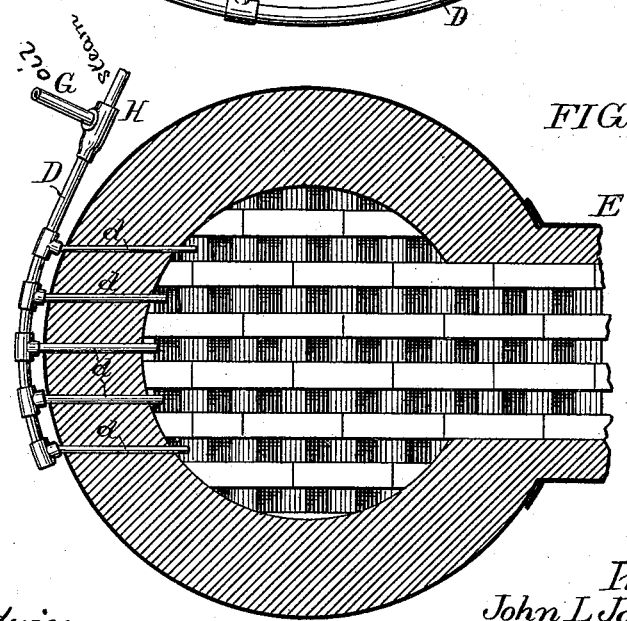

In the accompanying drawings, Figure 1 is a sectional view of an apparatus invented by us and by means of which our improved process of manufacturing gas may be carried into effect. Fig. 2 is a sectional plan view, on an enlarged scale, on the line 1 2, Fig. 1; and Fig. 3 is a sectional plan view on the line 3 4, Fig. 1, illustrating a modification.

A, B, and C are chambers filled with refractory material, each of said chambers consisting of a metallic shell, upon which suitable manhole-openings and valves are placed and which are lined throughout with fire-brick or similar non-conductor, said shells being connected to each other by passages E F, which are similarly lined with non-conducting material.

On the lining at the bottom of the chamber A are placed a number of slabs $a$ of fire-brick, forming between them chambers in which may be placed combustible material for igniting the heating-oil and serving to support the spaced layers of refractory material which are built so as to form what is known as "checker-work," the object being to expose a larger surface area for the absorption of heat and to form tortuous passages which will break up the vapors and prevent them from escaping too quickly. On top of the slabs $a$ is placed a layer $b$ of refractory material, formed, preferably, of rows of fire-brick running in radial lines from the center of the chamber to the lining, as illustrated in Fig. 2; and on line with this layer is a pipe D entirely surrounding the exterior of the casing and connected to an oil-supply pipe G, from which the oil is forced by a steam-injector H; and running from the pipe D to and through the lining of the chamber are a series of radial pipes $d$, which gradually increase in size as the distance from the oil-supply pipe G increases, so that on the injection of a supply of steam and oil the flow through all of these pipes will be about equal and the supply will be distributed to all portions of the chamber, the feeding to the upper portion being aided by the spaces between the radial lines of bricks in the layer $b$, as will be seen more readily on reference to Fig. 2. Above this layer $b$ the different layers of checker-work are placed, the successive layers crossing each other at right angles until the top of the chamber is reached, at which point one or more filling pieces or slabs are placed, in order to protect the manhole cover or door at the top of the chamber.

The passage E is filled with layers of checker-work in the same manner as the upper portion of the chamber A, as are likewise the passage F and the chambers B and C, except that the first layer of fire-brick immediately below the passage E is laid in the same manner as the layer $b$ in the chamber A, and a similar set of pipes (marked D' $d'$) are provided to supply the oil and steam from which the gas is manufactured.

At the top of the chamber C some space is left for the exit of the gas through a pipe I, leading to the wash-box, and the slabs at the top of the chambers A and B are omitted in this chamber, the manhole-opening being covered by a valve J, hung on a lever J', and which when open permits the escape of the products of combustion to the chimney, which in the present instance is shown in the form of a suspended stack $J^2$.

K is a pipe leading from a blast-fan to the lower portion of the chamber A, and K' is a similar pipe leading to the upper portion of the chamber B to supply air to such chamber, if required.

In manufacturing the gas it is first necessary to highly heat the refractory material in the chambers, which we proceed to do by first opening the manhole-door at the lower end of the chamber A and placing therein material which will ignite the oil subsequently added, the most convenient substance for this purpose being a quantity of ignited coal, which may be taken from the fire-box of the boiler used to supply steam to the chamber. The manhole-door is then closed, the valve in the air-blast pipe K is opened, and then the valves on the oil and steam pipes G H are opened and the supply of oil and steam injected at the base of the chamber A, the mixture of oil, steam, and air is ignited and forced through the entire series of chambers, heating the refractory material contained therein to the proper temperature, preferably to a substantially-uniform temperature, and finally escaping to the stack $J^2$. Should it be necessary to heat the chambers B and C to a higher temperature, a greater quantity of steam and oil is injected through the pipes D' $d'$ than the air furnished by the pipe K will combine with. Incomplete combustion will take place and will show by the heavy smoke or flame escaping from the top of the chamber C until the air-valve K' is opened and enough air is admitted into the upper portion of the chamber B to effect complete combustion of the oil. Considering now that the chambers have been heated to the proper temperature the air-blast and the oil and steam supply are shut off and the valve J at the top of the chamber C is closed. When this has been done, steam is admitted through the pipe $l$ to the base of the chamber A, the valve controlling the supply of steam and oil to the pipe D' encircling the upper portion of the chamber B is opened, and the valves on the pipes p q are also opened, admitting air under pressure to the wash-box. We prefer in this case to employ steam to inject the air into the box; but any other suitable means may be employed. The steam from the pipe l in passing up through the chamber A is superheated by contact with the highly-heated refractory material contained in the chamber, and when it reaches the hydrocarbon vapors in the radial chambers of the layer of fire-brick b' acts to force such vapors down through the chamber B and up through the chamber C, the vapors being brought into contact with the highly-heated refractory material in said chambers, and finally passing out through the pipe I to the wash-box in the form of a fixed gas of high-candle power, which is diluted by the injection of air into the wash-box.

The entrance of the steam and oil for the manufacture of gas will after a time cool the apparatus, and it will then be necessary to shut off the steam and oil valves on the pipes D' d' at the top of the generator B, close the steam-valve on the pipe l at the base of the chamber A, open valve J, admit air through the air-blast pipe K at the base of the chamber A, admit steam and oil through the pipes D d into the lower portion of the chamber A, and continue, as before described, to heat up the generator preparatory to again manufacturing gas.

In Fig. 3 we have illustrated a modification of the apparatus, in which the supply of oil for the manufacture of gas is injected by steam into the upper portion of the chamber A at a point directly opposite the passage E, leading to the chamber B; or such supply may be admitted at a point somewhat lower down, providing that the space above the pipe l is sufficient to permit the superheating of the steam before it reaches and mingles with the supply of oil and steam. The wash-box M is of ordinary construction, being provided with a diaphragm m, which divides the box into two compartments, and has a gas-inlet pipe I and a gas-outlet pipe I', which conducts the gas from the wash-box to a vertical scrubber N. The wash-box has also the usual water inlet and outlet pipes o o', and I find it advantageous to provide for the admittance of air in sufficient quantity through a pipe p to reduce the candle-power of the gas, as above described, the air being forced in by means of a pressure of steam from the pipe q. If this air were not used, it would be necessary to heat the refractory material in the chambers to or nearly to incandescence for the production of carbonic oxide and hydrogen as a diluent and a large volume of lamp-black would be made in the manufacture of the gas. The vertical scrubber N is cylindrical in form and is provided with a series of gratings n, which are supported at regular intervals in the casing, preferably by projecting flange-pieces n', which are bolted to the interior of the casing. Each of the gratings n consists merely of a series of bars regularly spaced and running parallel with each other, and the successive gratings are so placed that the bars of one shall be at right angles with those of the next, in order to more thoroughly break up and condense the gas which rises vertically through the scrubber and passes out the pipe R at the top and to atomize the water which is admitted through a pipe r and is distributed by means of a perforated cone S. The gas is thoroughly washed in this last device and passes out through the pipe R to the receiving-tank or to purifiers, if necessary.

Having thus described our invention, we claim and desire to secure by Letters Patent—

1. The process of manufacturing gas, which consists, first, in heating a series of chambers containing refractory material to a degree below that necessary to decompose steam; second, admitting thereto a mixed supply of steam and oil; third, forcing such mixed supply of steam and oil by other steam-pressure from its point of entrance through said chambers to an outlet, and, finally, condensing said steam, substantially as specified.

2. The process of manufacturing gas, which consists, first, in heating a series of chambers containing refractory material to a degree below that necessary to decompose steam; second, admitting thereto a supply of oil and steam; third, forcing such supply of oil and steam by other steam-pressure from its point of entrance to said chambers to a wash-box; fourth, injecting into said gas by steam-pressure a supply of air heated nearly to the temperature of the gas in the wash-box, and, finally, condensing all of the steam in the wash-box, substantially as specified.

3. An apparatus for manufacturing gas, comprising a series of communicating chambers filled with refractory material, an inlet for the heating supply of oil and steam at or near the lower end of the first of these chambers, a steam-pipe for admitting the steam to be superheated in the subsequent manufacture of the gas, said steam-pipe being situated at or near the lower end of the first of these chambers, an inlet for the supply of oil and steam from which the gas is to be manufactured, said inlet being situated at or near the top of the second of the series of chambers, and outlets in the last chamber of the series for the products of combustion and for the manufactured gas, substantially as specified.

4. An apparatus for manufacturing gas, comprising a series of communicating chambers filled with refractory material, an inlet for the heating supply of oil and steam, an air-blast inlet, and an inlet for steam to be superheated in the subsequent manufacture of the gas, all situated at or near the lower end of the first chamber of the series, an air-blast pipe to assist in heating the chamber, and an inlet for the supply of oil and steam from which the gas is to be manufactured, said inlets being situated at or near the top of the second chamber, and outlets for the products of combustion and the manufactured gas, said outlets being situated at or near the exit end of the final chamber of the series, substantially as specified.

In testimony whereof we have signed our names to this specification in the presence of two subscribing witnesses.

JOHN L. JANEWAY.
FERDINAND LOGAN.

Witnesses:
EUGENE ELTERICH,
JNO. E. PARKER.